(12) United States Patent
Crisi et al.

(10) Patent No.: US 8,360,754 B2
(45) Date of Patent: Jan. 29, 2013

(54) SUPPORT FOR ROLLING BEARING

(75) Inventors: Aldo Crisi, Cambiano (IT); Alessandro Follo, Grugliasco (IT); Vincenzo Pandolfo, Turin (IT); Carmelo Quartarone, Syracuse (IT)

(73) Assignee: Agilent Technologies, Inc., Santa Clara, CA (US)

( * ) Notice: Subject to any disclaimer, the term of this patent is extended or adjusted under 35 U.S.C. 154(b) by 676 days.

(21) Appl. No.: 12/369,658

(22) Filed: Feb. 11, 2009

(65) Prior Publication Data

US 2009/0208354 A1 Aug. 20, 2009

(30) Foreign Application Priority Data

Feb. 11, 2008 (EP) .................................. 08425079.4

(51) Int. Cl.
*F04B 35/04* (2006.01)
(52) U.S. Cl. .................................................. 417/423.4
(58) Field of Classification Search ............... 417/423.7, 417/423.4
See application file for complete search history.

(56) References Cited

U.S. PATENT DOCUMENTS

| 2,521,638 | A | | 9/1950 | Lamm | |
|---|---|---|---|---|---|
| 5,603,303 | A | * | 2/1997 | Okajima et al. | 123/508 |
| 5,895,202 | A | | 4/1999 | Alcatel | |
| 6,641,376 | B1 | * | 11/2003 | Englander | 417/363 |
| 2005/0207884 | A1 | * | 9/2005 | Conrad et al. | 415/90 |
| 2006/0122014 | A1 | * | 6/2006 | Kamdem | 474/70 |
| 2007/0108704 | A1 | * | 5/2007 | Craig et al. | 277/370 |

FOREIGN PATENT DOCUMENTS

| DE | 19818634 A1 | 11/1999 |
|---|---|---|
| FR | 2369059 A | 5/1978 |
| GB | 1331166 A | 9/1973 |
| WO | WO 2004/099623 A | 11/2004 |
| WO | WO 2006/131694 A | 12/2006 |

* cited by examiner

*Primary Examiner* — Anh Mai
*Assistant Examiner* — Hana Featherly

(57) ABSTRACT

A support for a rolling bearing of the kind equipped with an outer rotating ring for a rotary vacuum pump, the support comprising an inner portion that can be associated with the rotating ring, a fastening outer portion and a connecting portion, interposed between the inner and outer portions, wherein the connecting portion is a frusto-conical resilient element.

18 Claims, 4 Drawing Sheets

SUPPORT FOR ROLLING BEARING

CROSS REFERENCE TO RELATED APPLICATIONS

The subject patent application is claims priority of European Patent Application No. 08425079.4 filed in the European Patent Office on Feb. 11, 2008.

BACKGROUND OF THE INVENTION

The present invention relates to a support for rolling bearings. As known, rolling bearings are mechanical devices in which a relative motion, e.g. between a rotating element and a stationary element or between two elements rotating at different speeds, takes place with the interposition of balls or rollers rolling between two tracks, one of which is directly formed on the rotating element or on a ring secured thereto and the other is formed on the stationary element or on a second ring secured thereto. Generally, the balls or rollers are kept spaced apart by a variously shaped cage capable of separating and retaining the balls or rollers.

In certain industrial applications, a resilient support has to be inserted between the bearings and the seat where they are housed. This resilient support aims at compensating for a possible alignment error of the bearings themselves and at preventing vibrations, generated also because of such an alignment error, from propagating from the rotating element to the structure of the machine where the element is mounted. Another source of vibrations is a non-uniform mass distribution around the geometrical rotation axis, resulting in centrifugal forces in the rotating element and, consequently, in the bearings thereof.

One of the applications in which the use of resilient supports is generally provided for is in rotary vacuum pumps, in particular turbomolecular vacuum pumps of the kind equipped with mechanical bearings. As known, rotary vacuum pumps are equipped with rotating shafts supported by magnetic bearings or by mechanical rolling bearings in which the shaft is made to rotate at a very high speed, typically in the range 20,000 to 90,000 rpm. If the pump is equipped with mechanical bearings, in order to prevent the vibrations of the shaft and the pumping rotor associated therewith from propagating to the pump structure, the rolling bearings are surrounded by annular supports of elastomeric material.

FIG. 1 shows an example of turbomolecular pump where rotor 101 has rotor disks 103 cooperating with stationary stator disks, secured with the pump casing (not shown), in order to pump gas between the inlet and exhaust ports of the pump. The rotor 101 is mounted on a rotating shaft 105 supported by ball bearings 107a and 107b, and the rotating shaft 105 is made to rotate by an electric motor 109 housed in a cavity 111 formed in pump basement 117.

As it can be clearly seen in the enlarged portion of FIG. 1, a resilient annular support 113 formed by one or more rings is provided between each ball bearing 107a, 107b and the respective seat 115 in pump basement 117. The provision of annular supports 113 is provided above all to the need of damping vibrations transmitted by the rotating pump elements to the body of the same pump and through the pump to the vacuum chamber.

In some particularly critical applications (for instance, in mass spectrometry), in which the vacuum pump is used jointly with very sophisticated measurement instruments, it is indispensable to prevent the vibrations of the pump rotor from being transmitted to the remaining structures and in particular to the instrumentation. A direct result of the damping of such vibrations is also the reduction of the overall pump noise.

The provision of annular supports 113 also assists in considerable reduction of the value of the fist critical speed (intended as the lowest rotation speed, associated with a modal form with substantially non-deformed rotor, or "rigid rotor", at which the force transmitted to the bearings has a maximum), which in this manner is substantially lower than the nominal rotation speed of the pump, with a resulting effect of rotor self-balancing when such critical speed value is exceeded.

Further, the provision of the annular supports allows for compensating possible alignment errors related with the mechanical machining of the bearing seats. The alignment errors may be considerable and exceed the limits recommended by manufacturers for high speed precision bearings, such as those used for instance in turbomolecular pumps.

According to the prior art, the annular supports are resilient and are preferably made of elastomeric material, e.g. nitrile rubber. Yet, use of elastomeric supports entails serious drawbacks. The main drawback is due to the fact that the ball bearings mounted in vacuum pumps for operating correctly are generally subjected, to an axial preloading. For instance, in the case illustrated in FIG. 1, the preloading is exerted by spring 119. Now, the considerable axial friction existing between the external ring of the ball bearing and the elastomeric annular support can sensibly hinder the correct application of such preloading, especially as concerns bearing 107a, which is the farthest one from preloading spring 119 arranged in the pump basement.

In order to overcome such problem, there has been proposed to introduce metal inserts into the elastomeric annular support, in correspondence of the inner wall of the annular support, or to introduce a lubricant in correspondence of the inner wall. Such solutions, even if they reduce axial friction between the surface of the bearing and the support ring, cause other drawbacks. For instance, use of a lubricant introduces the risk of contaminating the vacuum chamber. Moreover, both solutions proposed above cause not only a reduction of axial friction, but also a reduction of tangential friction, which on the contrary has to be kept high to prevent the outer ring of the bearing from rotating relative to the annular support while the pump shaft is rotating.

SUMMARY OF THE INVENTION

Therefore, it is the main object of the present invention to remedy the above drawbacks by providing an annular support for rolling bearings, which enables obtaining the axial preloading necessary for the proper operation of the bearing itself, as well as a high tangential friction. The above and other objects are achieved by the support ring as claimed in the appended claims.

The interposition of a disc spring (or spring washer) between the bearing and the basement enables obtaining a sufficient axial sliding, which is necessary for the preloading of the bearing and maintaining a high tangential friction between the bearing and the basement.

Advantageously, in the field of turbomolecular vacuum pumps, these advantages results in the possibility of obtaining the desired preloading on the rolling bearings of the rotating shaft while avoiding the risk that the bearing can rotate relative to the basement.

In a preferred embodiment, the disc spring has a plurality of windows that, on the one side, contribute to reducing the axial elastic thrust and, on the other side, can be useful since they put the volumes separated by the disc spring into communication, for instance for the passage of cables and ducts.

BRIEF DESCRIPTION OF THE DRAWINGS

A preferred embodiment of the invention, given by way of non limiting example, will be described hereinafter with reference to the accompanying drawings, in which.

DETAILED DESCRIPTION OF THE INVENTION

Figure 1:
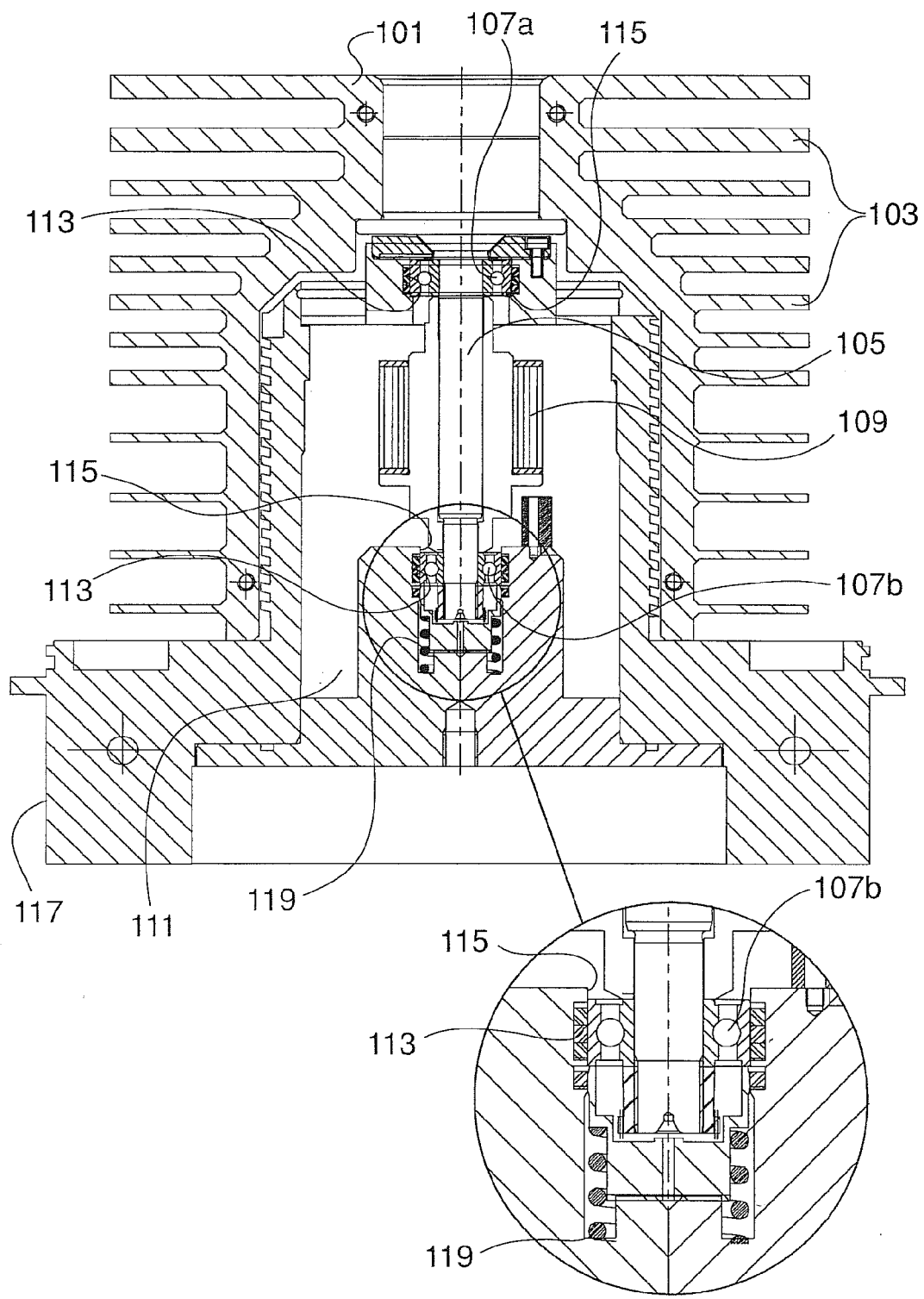
FIG. 1 is a schematic cross-sectional view of a prior art turbomolecular pump.
Figure 2:
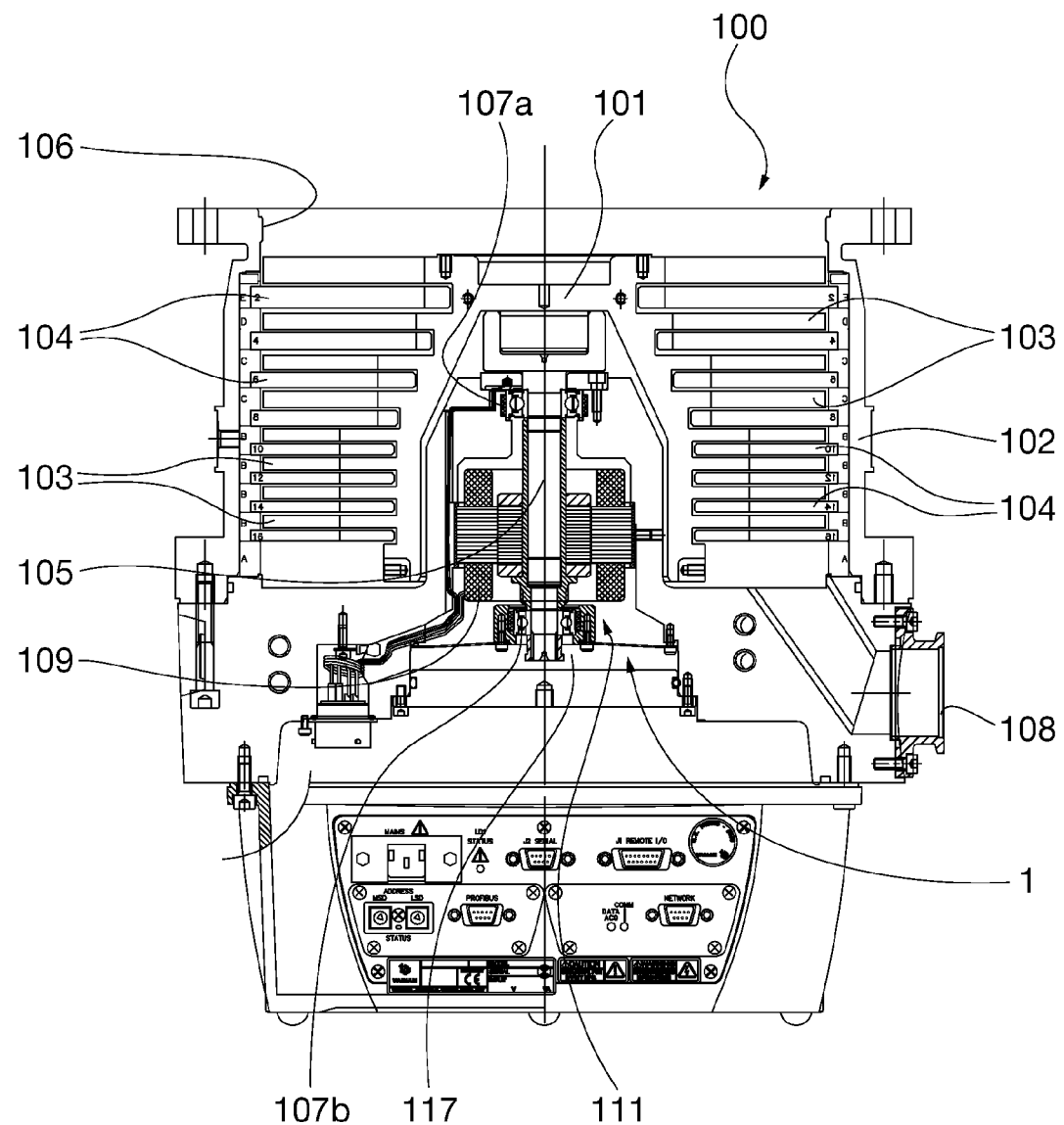
FIG. 2 is a schematic cross-sectional view of a turbomolecular pump using a support according to the invention.

Referring to FIG. 2, there is schematically shown a turbomolecular rotary vacuum pump using an inventive support for rolling bearings. Similarly to what has been previously described with reference to FIG. 1, turbomolecular pump 100 comprises rotor 101 with rotor disks 103 that cooperate with stationary stator disks 104, secured with the pump casing 102, in order to pump gas between inlet port 106 and exhaust port 108 of the pump. Rotor 101 is mounted on rotating shaft 105 supported by ball bearings 107a and 107b, and rotating shaft 105 is made to rotate by electric motor 109 housed in cavity 111 formed in pump basement 117. A support of the present invention is generally denoted in the figures by reference numeral 1. It is interposed between at least one of the ball bearings and the stationary part of the vacuum pump, substantially including the casing and the basement.

Figure 2A:
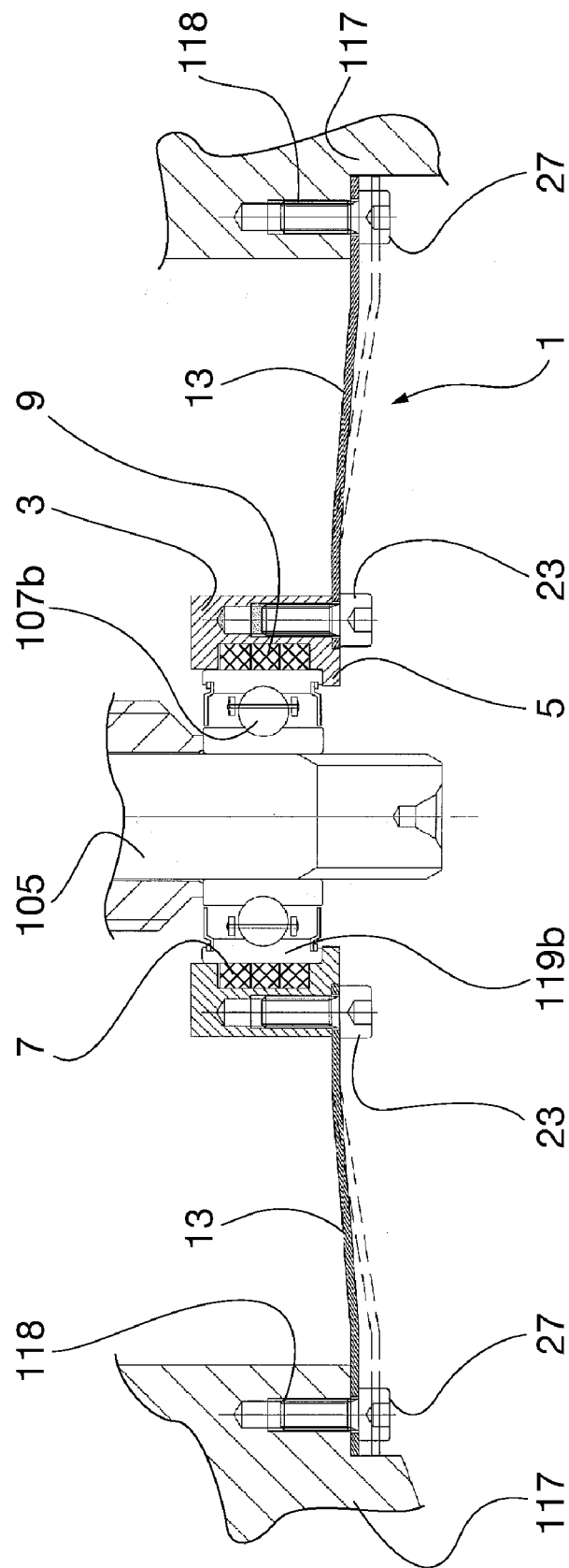
FIG. 2A shows an enlarged detail of FIG. 2.

Referring to FIG. 2A, the support 1 substantially comprises an inner portion 3, 15, which can be associated with outer rotating ring 119b of one of the bearings, a fastening outer portion 17, and a resilient, substantially frusto-conical connecting portion 19, interposed between said inner and outer portions. More particularly, in the illustrated example, support 1 is interposed between the lower ball bearing 107b and basement 117 of the vacuum pump.

Figure 3:
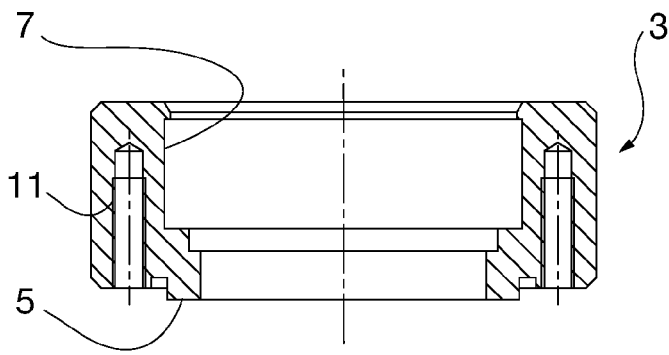
FIG. 3 is a cross-sectional view of the ring nut of the support shown in FIG. 2.

As it can be better seen in FIG. 2A, in the illustrated example, the inner portion of support 1 for rolling bearings comprises a substantially annular ring nut 3, shown in detail in FIG. 3 and arranged to be mounted onto outer rotating ring 119b of ball bearing 107b. In the illustrated example, ring nut 3 has an inward projecting annular edge 5, defining a corresponding abutment for outer ring 119b of bearing 107b. According to the invention, an annular seat 7 with substantially rectangular cross section is preferably formed on the internal wall of ring nut 3 facing the outer ring of ball bearing 107b, for receiving one or more resilient rings 9, e.g. made of elastomeric material.

Advantageously, a significant portion of the surface of outer ring 119b of ball bearing 107b is in contact with the elastomeric rings 9, in such a manner that a high tangential friction between ball bearing 107b and ring nut 3 is ensured. Optionally, an adhesive can be provided between said rings 9 and ring nut 3, and/or between rings 9 and the outer ring of the bearing, to further prevent any possibility of tangential sliding of resilient rings 9 relative to ring nut 3 while shaft 105 inserted in bearing 107b is rotating.

Figure 4A:
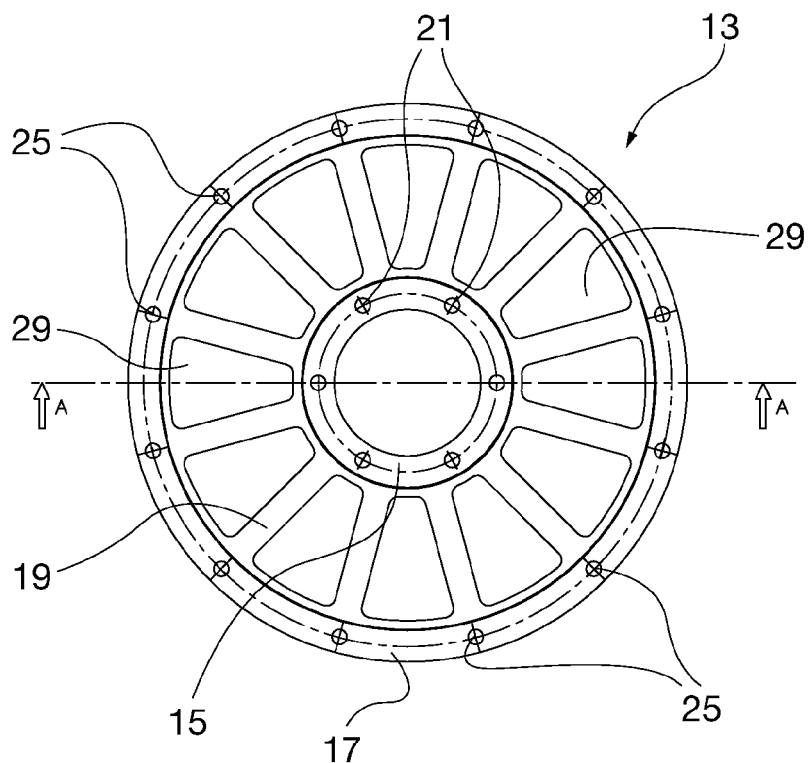
FIG. 4A is a plan view of the disc spring of the support shown in FIG. 2.
Figure 4B:
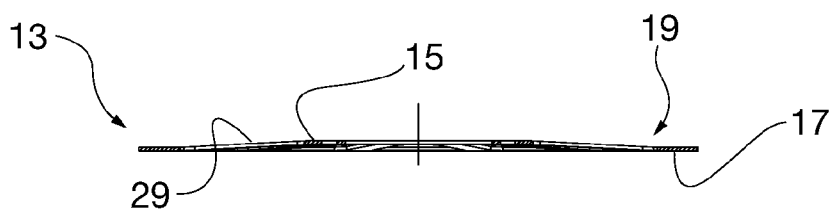
FIG. 4B is a cross-sectional view along line A-A of the disc spring shown in FIG. 4A.

Support 1 further comprises a resilient frusto-conical connecting portion 19, substantially corresponding to a disc spring (spring washer) 13, illustrated in detail in FIGS. 4A and 4B. As known, a disc spring is a substantially frusto-conical resilient member with a central bore, comprising an inner ring 15 of smaller diameter, an outer ring 17 of greater diameter, and a frusto-conical wall 19 connecting said rings, which wall can be resiliently squashed. Disc spring 13 is associated with ring nut 3 in correspondence of inner ring 15, whereas externally, along outer ring, the spring is arranged to be secured to basement 117 of vacuum pump 100.

In the example illustrated in FIGS. 2A, 4A and 4B, inner ring 15 of disc spring 13 has throughholes 21 for screws 23 penetrating into corresponding threaded holes 11 formed in ring nut 3, so that the coupling between disc spring 13 and ring nut 3 is ensured by screws 23. Other known means for securing disc spring 13 to ring nut 3 can be used as well, said securing means providing for a removable coupling between said disc spring and said ring nut, like in the case of screws 23, or even for a fixed coupling between said elements, for instance by gluing, welding or the like.

Still with reference to FIGS. 2A, 4A and 4B, also outer ring 17 of disc spring 13 has throughholes 25 for screws 27 penetrating into corresponding holes 118 formed in basement 117 of the pump. Also in this case, other known methods for securing disc spring 13 to basement 117 can be used as well. In this case, of course, use of a removable coupling is preferable, so that support 1 can be easily replaced if necessary. In case screws or the like are used, as shown in FIG. 4A, both holes 21 and holes 23 are preferably arranged with the same mutual spacing along the circumference of inner ring 15 and outer ring 17, respectively.

Advantageously, according to the invention, due to the resilience of disc spring 13 interposed between ball bearing 107b and basement 117 of vacuum pump 100, the drawbacks resulting from a high axial friction between the ball bearing and elastomeric ring(s) 9 are completely overcome.

In FIG. 2A, disc spring 13 is shown both in idle condition, before coupling with basement 117 (dashed line), and in operating condition, after such coupling (solid line). It is therefore evident that, because of the deformation of support 1 according to the invention, it is possible to achieve the desired preloading for ball bearings 107a, 107b and to ensure that said preloading keeps constant during pump operation. On the other side, it is possible to mount bearing 107b inside ring nut 3 with a very strong interference, and hence to obtain a very high tangential friction, without thereby affecting the axial sliding capabilities of the outer ring of the bearing.

Advantageously, according to the preferred embodiment illustrated in FIGS. 4A and 4B, disc spring 13 has a plurality of windows 29. Such windows 29, suitably sized and shaped, allow attaining the desired resiliency for disc spring 13 and hence adjusting the axial thrust depending on the applications. Moreover, such windows advantageously allow the passage of cables between the volumes separated by disc spring 13. Furthermore, they prevent pressure differences from arising between said volumes separated by disc spring 13.

Turning back to FIG. 2, lower bearing 107b is associated with support 1 according to the invention and upper bearing 107a is directly mounted on the stationary part of pump 100, with the only interposition of elastomeric rings 113. Clearly, a configuration can be envisaged in which support 1 according to the invention is associated with upper bearing 107a, whereas lower bearing 107b is directly mounted on the stationary part of pump 100, with the only interposition of elastomeric rings 113. Also, a configuration can be envisaged in which both upper bearings 107a and lower bearing 107b are associated with a support 1 according to the invention, interposed between each bearing 107a and 107b and the stationary part of pump 100, i.e. for instance the casing or the basement.

It will be clear for the skilled in the art that the support according to the invention described above attains the desired objects, in that it allows achieving the complete mutual independence of the axial friction and the tangential friction exerted on a rolling bearing. It will also be clear that the above description is given by way of non limiting example and that several changes and modifications are possible without departing from the scope of the invention, as defined by the appended claims.

What is claimed is:

1. A support for a rolling bearing having a rotating outer ring, the support comprising:
    a ring nut defining an annular seat for receiving the rotating outer ring; and
    a disc spring comprising an inner portion attached to the ring nut, a fastening outer portion, and connecting portion interposed between the inner portion and the connecting outer portion, the connecting portion being a substantially frusto-conical resilient element.

2. The support of claim 1, wherein said inner portion comprises an annular inner portion.

3. The support of claim 2, wherein said annular inner portion is removably attached to said ring nut via fasteners.

4. The support of claim 3, wherein the fasteners comprise screws.

5. The support of claim 2, wherein said annular inner portion is fixedly attached to said ring nut.

6. The support of claim 5, wherein the annular inner portion is fixedly attached via one of a weld and an adhesive.

7. The support of claim 1, wherein said ring nut has an inward projecting annular edge arranged to define a corresponding axial abutment of the annular seat for receiving the rotating outer ring.

8. The support of claim 1, wherein the annular seat houses one or more resilient elements.

9. The support of claim 8, wherein said resilient elements comprise rings of elastomeric material.

10. The support of claim 9, wherein an adhesive is provided between the resilient elements and the rotating outer ring.

11. The support of claim 9, wherein the rings of elastomeric material comprise nitrile rubber.

12. The support of claim 9, wherein an adhesive is provided between the resilient elements and the annular seat.

13. The support of claim 1, wherein said fastening outer portion comprises an annular outer portion.

14. The support of claim 13, wherein said annular outer portion has holes for securing said support to a pump basement via fasteners.

15. The support of claim 14, wherein the fasteners for securing the support to the pump basement comprise screws.

16. The support of claim 1, wherein said connecting portion defines a plurality of windows.

17. A rotary vacuum pump, comprising:
    a rotating shaft rotatable by an electric motor and supported by at least one or more rolling bearings, the rotating shaft being equipped with rotor disks cooperating with stator rings for pumping gas; and
    at least one support associated with a respective one of the rolling bearings, the at least one support comprising:
        a ring nut defining an annular seat for receiving a rotating outer ring of the rolling bearing; and
        a disc spring comprising an inner portion attached to the ring nut, a fastening outer portion, and connecting portion interposed between the inner portion and the connecting outer portion, the connecting portion being a substantially frusto-conical resilient element.

18. The rotary vacuum pump of claim 17, wherein said vacuum pump is a turbomolecular vacuum pump.

* * * * *